United States Patent [19]

Manwiller

[11] 4,243,574
[45] Jan. 6, 1981

[54] POLY(META-PHENYLENE ISOPHTHALAMIDE) MOLDING COMPOSITIONS

[75] Inventor: Carl H. Manwiller, Wilmington, Del.

[73] Assignee: E. I. Du Pont de Nemours and Company, Wilmington, Del.

[21] Appl. No.: 25,565

[22] Filed: Mar. 30, 1979

[51] Int. Cl.³ .......................... C08K 3/04; C08K 3/30
[52] U.S. Cl. .................................. 260/37 N; 525/178
[58] Field of Search ...................... 260/37 N; 525/178

[56] References Cited

U.S. PATENT DOCUMENTS

| 3,287,324 | 11/1966 | Sweeny | 260/78 |
| 3,925,323 | 12/1975 | Turnbull | 264/126 X |
| 3,954,703 | 5/1976 | Turnbull | 260/37 N |
| 3,965,236 | 6/1976 | Turnbull | 264/319 |
| 4,036,907 | 7/1977 | Turnbull | 260/37 N X |

FOREIGN PATENT DOCUMENTS

| 50-24506 | 3/1975 | Japan | 260/37 N |
| 50-36545 | 4/1975 | Japan | 260/37 N |

Primary Examiner—Sandra M. Person

[57] ABSTRACT

Poly(meta-phenylene isophthalamide) comprising encapsulated filler, a process for the preparation of these compositions by addition of the filler to the polymer solution before precipitation, and molded articles prepared from these materials characterized by increased strength at equal filler loadings.

9 Claims, No Drawings

POLY(META-PHENYLENE ISOPHTHALAMIDE) MOLDING COMPOSITIONS

BACKGROUND OF THE INVENTION

Poly(meta-phenylene isophthalamides) are useful in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces. These polymers are often prepared in the form of coalescible powders. The powders can be formed into the desired final shape by molding techniques or can be formed into stock shapes, such as rods, tubes and sheets which can be machined into the desired final form.

It is often desirable to incorporate fillers in poly(meta-phenylene isophthalamide) compositions before fabrication into their final form or desired shape. For example, the admixture of graphite in a powder intended for a bearing surface gives a lubricating effect which improves wear characteristics. Such additives have previously been incorporated by admixture with the coalescible poly(meta-phenylene isophthalamide) powder before fabricating into a stock shape or final molded article. However, the use of such additives has heretofore been accompanied by excessive loss of mechanical strength in the final fabricated article. A need therefore exists to provide a coalescible poly(meta-phenylene isophthalamide) material containing higher additive concentrations than have been possible before without depreciation of the physical properties of the molded article.

SUMMARY OF THE INVENTION

The instant invention provides a coalescible poly(meta-phenylene isophthalamide) powder containing unusually high concentrations of filler, a process for preparing these coalescible powders and shaped articles prepared therefrom.

Specifically, the instant invention provides a composition consisting essentially of a coalescible and densifiable powder of poly(meta-phenylene isophthalamide) having a density of about from 1.0 to 1.30 g/cc when pressed into a preform and a density when sintered of at least about 1.24 g/cc and about from 1 to 75 percent by weight, based on the total weight of the composition, of a particulate additive, the additive having been present during precipitation of the poly(meta-phenylene isophthalamide).

The invention further provides an improvement in the process for the preparation of coalescible and densifiable powder of poly(meta-phenylene isophthalamide) from a solution of about from 0.5 to 5.0 percent by weight, based upon the total weight of the solution, of poly(meta-phenylene isophthalamide) in a solvent selected from the group consisting of dimethylformamide and dimethylacetamide by bringing the solution into contact with water to form a slurry; agitating the slurry; and thereafter filtering the slurry to recover solid particles of poly(meta-phenylene isophthalamide); which improvement comprises adding to the solution of poly(meta-phenylene isophthalamide) about from 1 to 75 percent of a particulate additive, based on the combined weight of poly(meta-phenylene isophthalamide) and additive, prior to bringing the solution in contact with water to precipitate the polymer.

The invention further provides a shaped article consisting essentially of coalesced and densified solid particles of poly(meta-phenylene isophthalamide) having a density of at least 1.24 g/cc produced by pressing a coalescible and densifiable powder described above by subjecting the powder to a forming pressure of at least 10,000 psi. (69 MPa) to provide a preform having a density of at least about 1.0 g/cc and sintering the preform by heating to a temperature of about from 250° to 350° C. to provide the shaped article.

DETAILED DESCRIPTION OF THE INVENTION

The present invention is based on the discovery that the addition of modifying fillers to poly(meta-phenylene isophthalamide) is remarkably more effective when the filler is added to a solution of the polymer prior to precipitation and polymer particle formation.

The process for preparing the poly(meta-phenylene isophthalamide) used in the present invention can be the same as that previously used in the art and described, for example, in Turnbull U.S. Pat. No. 3,965,236, hereby incorporated by reference. As shown in that patent, coalescible powders of poly(meta-phenylene isophthalamide) are prepared from a solution of the polymer in a solvent such as dimethylacetamide (DMAC), the solution being combined with a precipitant such as water to provide a slurry of polymer. The slurry is then filtered, washed, and dried to provide a filter cake which is ground and screened to the desired particle size.

In accordance with the instant invention, the desired particulate additive is incorporated by addition to the polymer solution before precipitation. A wide variety of filler materials or additives can be used in the present invention, including, for example, finely divided metals, metal oxides, minerals, abrasive materials such as silicon carbide and diamonds, graphite, glass, molybdenum disulfide, cryolite, boron nitride, iron sulfide, clay, mica, vermiculite, kaolin, other particulate polymers such as polytetrafluoroethylene, and mixtures of any of the foregoing materials. The particle size of the additive is not a critical aspect of the invention, and will vary with the intended purpose of the additive.

The additives are incorporated by any conventional blending apparatus having adequate sheer to disperse the additive uniformly throughout the polymer solution. In a preferred embodiment of the present invention, water, the normal precipitant for the polymer, is added to the polymer solution before blending of the additive, in quantities less than that required to precipitate the polymer from the solution. Such quantities will, of course, depend on the particular solution involved, but are generally about 20 percent or less.

The fillers are added in quantities of about from 1 to 75 percent. LIttle desirable effect from the filler is realized below 1 percent, and quantities of filler in excess of 75 percent tend to depreciate the quality of finished products resulting from the present invention. Preferably, the particulate additive comprises about from 12 to 60 weight percent of the combined weight of polymer plus filler. Of the many fillers which can be used in the preparation of these poly(meta-phenylene isophthalamide) powders, metals, metal oxides, graphite, molybdenum disulfide, polytetrafluoroethylene, and clay are preferred in the present invention. Graphite is particularly preferred because of its lubricating effect on finished products prepared from the coalescible resin particles.

After addition of the filler material, the poly(meta-phenylene isophthalamide) solution is contacted with the precipitant, filtered, washed, dried, and ground according to the procedures previously used in the preparation of these powders. Most frequently, the solution is added to water. However, as an alternative to adding the polymer solution to water or another nonsolvent for the polymer, precipitant can be rapidly added to the polymer solution with stirring, or a stream of the polymer solution with filler can be co-mixed with the precipitant stream with strong agitation. Particularly good flow characteristics in the precipitated polymer are obtained when the precipitant is maintained at a temperature of about from 10°–30° C.

The particulate coalescible powders of the instant invention differ markedly from the dry mixtures of poly(meta-phenylene isophthalamide) and filler previously known in the art. The present powders exhibit a homogeneity between polymer and filler not previously attainable. This homogeneity stems from the partial or total encapsulation of the filler particles by the polymer resulting from the coprecipitation of filler and polymer. This encapsulation permits the incorporation of substantially higher quantities of the additive without compromising the ability of the powder to coalesce and densify into molded articles. With dry blending of additives and particularly graphite, the additive tends to adhere to the surface of resin particles, interfering with coalescence and leading to inferior physical properties in the final molded articles.

A further advantage of the present compositions over those previously known is improved processibility. The present particles provide good powder flow and can be readily handled using automatic processing equipment. The additive, being encapsulated in the polymer, does not exhibit any tendency to segregate itself from the polymer particles, a difficulty so frequently encountered in dry blended additives.

The process for preparing the present articles permits increased productivity through more efficient use of both raw materials and process equipment. Filler losses through segregation during processing and adherence of filler particles to blending equipment are substantially eliminated. In addition, it has been found that, with the presence of the additive in a polymer solution, less water is necessary for the precipitation of the resin particles. This reduced quantity of process fluids makes the solvent recovery faster and more economical, with savings in recycle cost of up to 50 percent. Additional efficiencies are realized through the elimination of dry blending equipment.

Molded articles prepared from the polymer particles of the present invention show enhanced physical properties. These included increased strength at comparable graphite loading levels. In addition, molded articles prepared from the present compositions exhibit superior resistance to water absorption, a characteristic of prime importance in determining dimensional stability of a fabricated part.

The invention is further illustrated by the following specific examples. In these examples, the poly(meta-phenylene isophthalamide) is prepared according to the procedures described in Sweeny U.S. Pat. No. 3,287,324. The polymer is initially obtained as a solution having the nominal concentration of 19% polymer and 9% calcium chloride in N,N-dimethylacetamide solvent. In the examples, this solution will be designated the base resin solution.

COMPARATIVE EXAMPLES A–C

The base resin solution is diluted with additional DMAC to bring the polymer concentration to 2.7% by weight. Two streams, the diluted base resin solution and water precipitant, are pumped simultaneously into a turbulent mixing zone where the polymer precipitates. The ratio of the two streams is such that the final liquid phase contains 33% DMAC by weight. The polymer is recovered by filtration and washing free of DMAC by reslurrying the polymer in water several times until the DMAC level is below 0.1% by weight. The polymer is then dried overnight at 130° C. in a circulating air oven. Dried polymer is then comminuted and screened through a 35 mesh U.S. Bureau of Standards screen to provide a molding resin. Fillers are dry blended with the molding resin prior to fabrication. Typical properties of three compositions, molded using techniques described in U.S. Pat. No. 3,925,323, are shown in Table I. Preforms are compacted using 44,000 psi (303 MPa) pressure, dried overnight at 240° C., heated to 300° C. over 30 minutes and sintered 1.5 hours at 300° C. under a nitrogen atmosphere.

TABLE I[a]

| Example | Filler Type/Wt% | Tensile Strength (psi/MPa) | Elongation (%) |
|---------|-----------------|----------------------------|----------------|
| A | None | 17,500/121 | 4.8 |
| B | Graphite/12 | 9,400/64.8 | 2.9 |
| C | PTFE[b]/12 | 9,300/64.1 | 2.8 |

[a]Values from Vespel ® Parts Bulletin E-06470, E. I. du Pont de Nemours and Company, Inc.
[b]Polytetrafluoroethylene

EXAMPLES 1–4

Suspensions of filler particles in dilute resin solution are prepared by diluting the base resin solution with DMAC and then mixing in the filler. Thus, base resin solution is diluted with DMAC and mixed with graphite to prepare a solution which contains 2.7% by weight of resin and a quantity of graphite to provide 12% in the resin product. The suspension is added to a precipitant solution which is stirred at slow to medium speed in a blender, typically at an addition rate of about 15 ml/min. The product is recovered by filtration on a Buchner funnel. The solvent wet cake is squeezed using a rubber dental dam followed by reslurrying three times with water in a blender. The squeezed cake is dried in a vacuum oven at 200° C. overnight and then comminuted in a blender for testing. The powder is formed into tensile bars as specified in ASTM E8 by first compacting at 60,000 psi 414 (MPa) and then free sintering in a nitrogen atmosphere at 300° C. for 1.5 hours.

EXAMPLES 5–8

The general procedure of Examples 1–4 is repeated, except that DMAC is included in the precipitant solution.

EXAMPLES 9–14

The general procedure of Examples 1–4 is repeated, except that water is also used in diluting the base resin solution.

EXAMPLES 15-21

Diluted base resin solution containing suspended filler particles is stirred at slow to medium speed in a blender and water precipitant is added rapidly in a drenching manner. Product recovery and evaluation are the same as in Examples 1-4.

The polymer solutions, precipitant solutions and molded article properties for Examples 1-21 are summarized in the following Table II.

TABLE II

POLYMER SOLUTIONS

| Example | Conc. (Wt %) | Filler/(Wt %) | Quan. (ml) |
| --- | --- | --- | --- |
| 1 | 2.7 | Graphite/12 | 200 |
| 2 | 2.7 | PTFE/12 | 200 |
| 3 | 2.7 | Graphite/30 | 250 |
| 4 | 2.7 | $MoS_2$/60 | 250 |
| 5 | 2.7 | Graphite/12 | 200 |
| 6 | 2.7 | Graphite/30 | 250 |
| 7 | 2.7 | Graphite/30 | 250 |
| 8 | 2.7 | Graphite/12 | 250 |
| 9 | 2.7 | PTFE/12 | 250 |
| 10 | 2.9 | PTFE/12 | 250 |
| 11 | 2.9 | PTFE/12 | 250 |
| 12 | 2.9 | Graphite/30 | 250 |
| 13 | 2.9 | Graphite/30 | 250 |
| 14 | 2.7 | Graphite/60 | 250 |
| 15 | 2.7 | Graphite/30 | 250 |
| 16 | 2.7 | "Celite" (a) 545/30 | 250 |
| 17 | 2.7 | $MoS_2$/50 | 300 |
| 18 | 2.7 | $MoS_2$/40 | 300 |
| 19 | 2.7 | $MoS_2$/30 | 300 |
| 20 | 2.7 | Clay/30 | 250 |
| 21 | 2.7 | Clay/50 | 250 |

(a) "Celite" is a registered trademark of Johns-Manville Corporation.

PRECIPITANT SOLUTIONS

| Example | Quan. (ml) | Initial Temp. (°C.) |
| --- | --- | --- |
| 1 | 300 | 90 |
| 2 | 250 | 90 |
| 3 | 125 | 23 |
| 4 | 150 | 23 |
| 5 | 300(a) | 50 |
| 6 | 300(b) | 23 |
| 7 | 300(c) | 23 |
| 8 | 300(d) | 23 |
| 9 | 100 | 23 |
| 10 | 150 | 23 |
| 11 | 125 | 23 |
| 12 | 125 | 23 |
| 13 | 110 | ca 0 |
| 14 | 120 | 23 |
| 15 | 125 | 23 |
| 16 | 300 | 23 |
| 17 | 500 | 23 |
| 18 | 500 | 23 |
| 19 | 500 | 23 |
| 20 | 300 | 23 |
| 21 | 300 | 23 |

(a) 84% $H_2O$, 16% DMAC
(b) 65% $H_2O$, 35% DMAC
(c) 60% $H_2O$, 40% DMAC
(d) 75% $H_2O$, 25% DMAC

MOLDED ARTICLE PROPERTIES

| Example | Tensile Strength (psi/MPa) | Elongation (%) |
| --- | --- | --- |
| 1 | 16,900/117 | 3.4 |
| 2 | 21,500/148 | 5.6 |
| 3 | 13,900/95.8 | 2.7 |
| 4 | 14,800/102 | 2.0 |
| 5 | 17,600/121 | 4.0 |
| 6 | 15,100/104 | 2.9 |
| 7 | 15,600/108 | 2.8 |
| 8 | 18,000/124 | 4.0 |
| 9 | 19,100/125 | 5.0 |
| 10 | 15,500/107 | 4.3 |
| 11 | 13,400/92.4 | 3.2 |
| 12 | 17,400/120 | 3.6 |
| 13 | 17,700/122 | 3.8 |
| 14 | 12,600/86.9 | 1.5 |
| 15 | 14,400/99.3 | 2.8 |
| 16 | 12,000/82.7 | 3.1 |
| 17 | 14,500/100 | 2.1 |
| 18 | 16,300/112 | 2.8 |
| 19 | 17,200/119 | 3.9 |
| 20 | 17,200/119 | 3.1 |
| 21 | 11,600/80.0 | 1.6 |

EXAMPLE 22

Base resin solution (133 pounds, 293 kg) is diluted with DMAC (750 pounds, 1653 kg) and water (113 pounds, 293 kg) to produce a diluted polymer solution containing 2.7% by weight of polymer. Dixon's "Airspun" graphite (3.5 pounds, 7.72 kg) is mixed into the diluted polymer solution. The diluted polymer solution and water precipitant are pumped simultaneously into a turbulent mixing zone where the polymer precipitates. The ratio of the two streams is such that the final liquid phase contains 45% DMAC by weight. The polymer is recovered by filtration, washing substantially free of DMAC by reslurrying the polymer in water several times, and then drying overnight at 130° C. in a circulating air oven. The dried polymer is comminuted and screened through a 35 mesh U.S. Bureau of Standards screen to provide a molding resin. The polymer is molded into a test bar and tested according to the procedures of Examples 1-4. The molded product, which contains 12% graphite by weight, is found to have a tensile strength of 16,500 psi, 114 MPa, an elongation of 4.5% and a sintered density of 1.384 g/cc.

EXAMPLE 23

The general procedure of Example 22 is repeated, except that Du Pont's DLX-6000 fluorocarbon resin powder (3.5 pounds, 7.72 kg) is mixed into the diluted polymer solution prior to precipitating the product instead of the graphite. The product, which is 12% fluorocarbon resin by weight, is found to have a tensile strength of 13,700 psi, 94.5 MPa, an elongation of 3.2% and a sintered density of 1.377 g/cc.

EXAMPLE 25 AND COMPARATIVE EXAMPLE D

In Example 25 and Comparative Example D, a series of comparisons was made between a composition of the present invention containing 30% encapsulated graphite and a prior art composition containing 12% by weight of graphite incorporated by dry blending. Samples of each composition were molded at four different compaction pressures for the preforming operation. These pressures are designated as A. 15,000 psi/103 MPa
B. 30,000 psi/207 MPa
C. 45,000 psi/310 MPa
D. 60,000 psi/414 MPa.

The preforming was followed by a sintering cycle of 1.5 hours at 300° C. in a nitrogen atmosphere. The resulting molded articles were evaluated and the test results summarized in Table III.

TABLE III

| | Preforming Pressure | Comparative Example D (12% graphite) | Example 25 (30% Encapsulated graphite) |
|---|---|---|---|
| Tensile Strength (psi/MPa) | A | 5500/37.9 | 11,400/78.6 |
| | B | 6900/47.6 | 12,900/88.9 |
| | C | 8500/58.7 | 13,200/91.0 |
| | D | 9100/62.7 | 12,500/86.1 |
| Elongation (%) | A | 1.5 | 1.9 |
| | B | 1.5 | 2.3 |
| | C | 1.9 | 2.1 |
| | D | 2.2 | 2.0 |
| Density (g/cc) | A | 1.315 | 1.471 |
| | B | 1.355 | 1.495 |
| | C | 1.375 | 1.496 |
| | D | 1.377 | 1.494 |
| Shrinkage (Width) (%) | A | 6.2 | 4.7 |
| | B | 3.4 | 2.4 |
| | C | 3.0 | 1.6 |
| | D | 2.8 | 1.4 |
| Shrinkage (Length) (%) | A | 7.3 | 5.4 |
| | B | 4.9 | 3.4 |
| | C | 4.2 | 2.8 |
| | D | 4.0 | 2.4 |

The encapsulated compositions of the present invention exhibit superior properties at a higher filler level, and there is less variation in properties over the upper range of compaction pressures.

EXAMPLES 26-27 AND COMPARATIVE EXAMPLE E

In Examples 26 and 27, the blends of polymer and additive of Examples 22 and 23 were formed into discs for testing water absorption. For Comparative Example E, the resin blend of Comparative Example B was used. Discs 1 inch (25.4 millimeters) in diameter and 0.25 inches (6.25 millimeters) thick were molded and immersed into water at room temperature. Weight gain was measured at the intervals reported in the following Table IV. The slow rate of absorption of water by the molded compositions of the present invention contributes to dimensional stability in parts made of these resins when exposed to air of varying humidities.

TABLE IV

| | % WEIGHT GAIN | | | | |
|---|---|---|---|---|---|
| Hours | 24 | 336 | 1056 | 1656 | 2000 |
| Comparative Example E | 1.90 | 6.81 | 9.32 | 10.12 | 10.41 |
| Example 26 | 0.22 | 0.92 | 1.73 | 2.25 | 2.50 |
| Example 27 | 0.18 | 0.78 | 1.47 | 1.90 | 2.12 |

EXAMPLE 28

Base resin solution is diluted with DMAC and water to provide a solution containing 2.7% polymer and 15% water. Graphite is added to this solution in an amount to give 12% by weight based on polymer. This suspension (250 ml) is added to water (140 ml) at room temperature stirred moderately in a blender. The recovered product, obtained by filtration, water washing and drying at 200° C., is cut in a blender to a free-flowing powder. A volume flow time of 62 sec is measured by allowing 5 cc of resin to flow through an orifice calibrated with standard 150 emery grit (ASTM B213.48). Flow is expressed on a 25 cc volume basis. Tensile strength and elongation of this composition is found to be 17,600 psi/121 MPa and 5.8%.

EXAMPLE 29

Base resin solution is diluted with methanol to provide a solution containing 2.7% polymer. Graphite is added to this solution in an amount to give 30% by weight based on polymer. This solution (211 ml) is added to methanol (390 ml) agitated moderately in a blender for about one minute. The DMAC concentration in the liquid is approximately 38% by weight. The product is recovered by filtration, washing with methanol, drying at 200° C. in a vacuum oven overnight and cutting in a blender. Flow time for the powder is 135 sec, its apparent density is 0.17 g/cc, and its tensile strength and elongation in molded form are 17,800 psi/123 MPa and 4.3%.

EXAMPLES 30-32

Base resin solution is diluted with DMAC and water to provide a solution containing 2.7% polymer and 15% water. Graphite is added to this solution in an amount to give 30% by weight based on polymer. This suspension (250 ml) is added to water (200 ml) stirred moderately in a blender. The water precipitant is maintained at different initial temperatures in Examples 30, 31 and 32 as shown in Table V. In these runs, the concentration of the DMAC in the filtrate is 45% by weight. Polymer is recovered and evaluated and the results are summarized in Table V.

TABLE V

| | Precipitant Temp. (°C.) | |
|---|---|---|
| Example | Initial | Final |
| 30 | 10 | 32 |
| 31 | 20 | 40 |
| 32 | 30 | 47 |

| Example | Powder Volume Flow (Sec) | Powder Apparent Density (g/cc) | T.S. (psi/MPa) | E (%) |
|---|---|---|---|---|
| 30 | 67 | 0.35 | 6000/41.4 | 0.9 |
| 31 | 75 | 0.27 | 11,500/79.3 | 2.0 |
| 32 | 120 | 0.20 | 13,900/95.9 | 2.5 |

I claim:

1. A coalescible and densifiable powder of poly(meta-phenylene isophthalamide) having good flow characteristics, a density of about from 1.0 to 1.3 g/cc when pressed into a preform and a density when sintered of at least about 1.24 g/cc and containing about from 1-75% by weight, based on the total weight of the composition, of a particulate additive, the additive having been present during the precipitation of the poly(meta-phenylene isophthalamide, and the precipitant having been maintained at a temperature of about from 10°-30° C. during the precipitation.

2. A composition of claim 1 wherein the particulate additive comprises about from 12 to 60% by weight of the composition.

3. A composition of claim 1 wherein the particulate additive is selected from the group consisting of metals, metal oxides, graphite, molybdenum disulfide, polytetrafluoroethylene and clay.

4. A composition of claim 3 wherein the additive consists essentially of graphite.

5. A composition of claim 3 wherein the additive consists essentially of molybdenum disulfide.

6. In the process for the preparation of coalescible and densifiable powder of poly(meta-phenylene isophthalamide) from a solution of about from 0.5 to 5.0 percent by weight, based upon the total weight of the solution, of poly(meta-phenylene isophthalamide) and a solvent selected from a group consisting of dimethylformamide and dimethylacetamide by bringing the solution into contact with water to form a slurry; agitating the slurry; and thereafter filtering the slurry to recover solid particles of poly(meta-phenylene isophthalamide); the improvement which comprises adding to the solution of poly(meta-phenylene isophthalamide) about from 1–75% of an additive, based on the combined weight of poly(meta-phenylene isophthalamide) and additive, prior to bringing the solution in contact with water to precipitate the polymer and wherein the water is maintained at a temperature of about from 10°–30° C. during precipitation.

7. A process of claim 6 wherein the additive is selected from the group consisting of metals, metal oxides, graphite, molybdenum disulfide, polytetrafluoroethylene, and clay.

8. A process of claim 7 wherein the additive consists essentially of graphite.

9. A process of claim 7 wherein the additive consists essentially of molybdenum disulfide.

* * * * *